United States Patent Office 3,515,732
Patented June 2, 1970

3,515,732
VAT DYESTUFFS CONTAINING
SULFONAMIDE GROUPS
Max Staeuble and Kurt Weber, Basel, Switzerland, assignors to Ciba Limited, Basel, Switzerland, a company of Switzerland
No Drawing. Continuation of application Ser. No. 202,959, June 18, 1962. This application Aug. 23, 1966, Ser. No. 574,474
Claims priority, application Switzerland, Dec. 31, 1958, 67,908/58; Mar. 2, 1959, 70,227/59
Int. Cl. C09b 3/30
U.S. Cl. 260—354                                4 Claims

ABSTRACT OF THE DISCLOSURE

Vat dyestuffs are provided which contain at least one grouping of the formula —$SO_2NH$—R in which R represents a β-sulfatoalkyl group and especially a lower β-sulfatoalkyl group. In addition to the said grouping the dyestuffs may contain substituents that are customarily present in vat dyestuffs, for example, halogen atoms or alkoxy, acylamino or alkyl groups. A process for the preparation of such vat dyestuffs is also provided. The dyestuffs are suitable for dyeing a wide variety of materials, and especially, for the dyeing or printing of textile materials of natural or regenerated cellulose by the methods usual for the dyeing or printing of vat dyestuffs. The dyeings and prints produced possess excellent fastness to light and wet fastness.

---

This is a continuation of copending application Ser. No. 202,959, filed June 18, 1962, now abandoned, which is a continuation-in-part of copending application Ser. No. 860,628 filed Dec. 21, 1959, now abandoned.

This invention provides vat dyestuffs which contain at least one grouping of the formula (1)                     —$SO_2NH$—R in which R represents a β-sulfatoalkyl group, especially a lower β-sulfatoalkyl group. The term "lower" in this connection means not more than 6 carbon atoms. R advantageously represents a radical of the formula

—$CH_2CH_2OSO_3H$

The term "vat dyestuffs" comprises dyestuffs which are capable of being converted by reduction into a so-called leuco-form or vat, possess a better affinity for natural and regenerated cellulose fibers than in the non-reduced form, and can be reconverted by oxidation into the original chromophoric system. As suitable vat dyestuffs there may be mentioned more especially those of the anthraquinone series, for example, those which contain an unmodified 9:10-oxoanthracene ring and also those anthraquinones which contain fused-on carbocyclic or heterocyclic rings or consist of a plurality of anthraquinone units, and also vat dyestuffs of perylene tetracarboxylic acid and naphthalene tetracarboxylic acid, and indigoid vat dyestuffs. In addition to at least one grouping of the Formula 1, the dyestuffs may contain substituents that are customarily present in vat dyestuffs, for example, halogen atoms or alkoxy, acylamino or alkyl groups.

The invention also provides a process for the manufacture of the above new dyestuffs wherein (a) a vat dyestuff containing at least one sulfonic acid halide group is condensed with an amine of the formula $NH_2R$, in which R has the meaning given in connection with Formula 1, or (b) a vat dyestuff containing at least one sulfonic acid-β-hydroxyalkylamide group is treated with a sulfating agent or (c) an aminoanthraquinone is reacted with an acylating agent which contains a β-sulfatoalkyl-sulfonamide group, and especially one of the formula

—$SO_2NHCH_2CH_2O$—$SO_3H$ or (d) an anthraquinone compound containing a mobile halogen atom is reacted with an amine containing a β-sulfatoalkyl-sulfonamide group.

In the process as carried out under (a) there are advantageously used as starting materials vat dyestuffs containing at least one sulfonic acid chloride group. Of special interest are vat dyestuffs containing two such groups. As examples of suitable starting materials there may be mentioned more especially those of the anthraquinone series: 1:5-dibenzoylamino-anthraquinone disulfochloride, dibenzanthrone disulfochloride, isodibenzanthrone disulfochloride, and also the sulfochlorides of anthanthrone, dibenzpyrene-quinone, pyranthrone, acedianthrone, flavanthrone, indanthrone, N:N'-diethyldipyrazole-anthronyl, N:N'-diisopropyl-dipyrazole anthronyl, anthraquinone-2:1(N)1':2'-(N) naphthacridone, 1:1'-dianthrimide-carbazole, 2'-2"-diphenyl - anthraquinone-1:2(N)-dithiazole, 2':2"-diphenyl-anthraquinone-5:7(N)-dithiazole.

In addition to sulfochlorides of the anthraquinone series there may be mentioned sulfochlorides of indigoid vat dyestuffs, perylene tetracarboxylic acid diimides; perinone dyestuffs and cobalt phthalocyanine. The aforesaid sulfochlorides can be obtained by treating the appropriate vat dyestuff with chlorosulfonic acid, or by reacting the appropriate sulfonic acids with an acid-halogenating agent, such as phosphorus halides, thionyl chloride or chlorosulfonic acid, known methods being used for carrying out the aforesaid reactions. Another method of obtaining the sulfochlorides used as starting materials consists in acylating an aminoanthraquinone with benzoic acid-sulfonic acid dichloride, whereby a chlorosulfonyl-benzoylamino-anthraquinone is obtained.

The reaction of the aforesaid sulfochlorides with an amine of the formula $NH_2R$ may be carried out in an inert organic solvent, for example, nitrobenzene, chlorobenzene or ortho-dichlorobenzene at a raised temperature. As, on working up, the sulfochlorides are generally obtained in the form of aqueous suspensions, it is of advantage to carry out the reaction with the amine of the formula $NH_2R$ in an aqueous medium, advantageously in the presence of an acid-binding agent, for example, sodium acetate, sodium hydroxide or sodium carbonate. The molar proportions of the components are preferably so chosen that for each sulfochloride group in the vat dyestuff at least one molecular proportion of an amine of the formula $NH_2R$ is used.

In the form of the process described under (b) there are advantageously used as starting materials anthraquinone vat dyestuffs containing one or two sulfonic acid β-hydroxyethylamide groups, for example, mono- or di-sulfonic acid hydroxyethylamides of 1:5-dibenzoylamino-anthraquinone or of dibenzanthrone or of isodibenzanthrone, and also sulfonic acid hydroxyethylamides of anthrathrone, dibenzpyrenequinone, pyranthrone, acedianthrone, flavanthrone, indanthrone, N:N'-diethyldipyrazole-athronyl, N:N' - diisopropyl-dipyrazole - anthronyl, anthraquinone-2:1(N)-1':2'(N)naphthacridone, 1:1'-di-anthrimide-carbazole, or 2':2"-diphenylanthraquinone-1:2(N)-dithiazole, 2':2"-diphenylanthraquinone-5:7(N)-dithiazole.

In addition to the aforesaid sulfonic acid hydroxyethyl-amides of the anthraquinone series, there may be mentioned sulfonic acid hydroxyethylamides of indigoid vat dyestuffs, perylene tetracarboxylic acid diimides, perinone dyestuffs or cobalt phthalocyanine. The aforesaid sulfonic acid hydroxyethylamides can be obtained by reacting the appropriate sulfonic acid chloride with β-hydroxyethylamine, or by reacting a vat dyestuff containing a mobile halogen atom, for example, an aminoanthraquinone of which the amino group is substituted by a chlorotriazine radical, with an amine of the formula

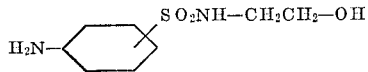

The sulfating of the hydroxyethylsulfonamides is advantageously carried out in concentrated sulfuric acid in the cold, for example, within the range of 0–50° C., and advantageously with at least 5 parts of sulfuric acid for each part of dyestuff. The sulfating can also be carried out with oleum or chlorosulfonic acid or an addition compound of chlorosulfonic acid with a tertiary base or amide, for example, pyridine, triethylamine or dimethylformamide.

In the form of the process described under (c) there are used as starting materials aminoanthraquinones, for example, 1:5-diaminoanthraquinone, 1-amino-5-benzoylaminoanthraquinone, 4 - aminoanthraquinone-2:1(N)-acridones, 4:4'- or 4:5'- or 5:5'-diamino-1:1'-dianthrimidecarbazole or 5-aminoanthraquinone-2:1(N)-':2'(N)-naphthcarbazole.

As acylating agents containnig a β-sulfatoalkylsulfonamide group there may be mentioned more especially benzoic acid halides and preferably the compound of the formula

These compounds are advantageously obtained by reacting the appropriate sulfobenzoic acid with chlorosulfonic acid to form the benzoic acid sulfochloride, condensing the latter with β-sulfatoethylamine or β-hydroxyethylamine to form benzoic acid-(β-sulfatoethyl)- or -(β-hydroxyethyl)-sulfonamide, and reacting the latter with a sulfating agent. As acylating agents there may be mentioned also, for example, compounds of the formula

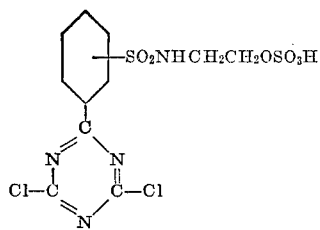

The reaction of the aminoanthraquinone with the acylating agent is advantageously carried out in an inert organic solvent, for example, nitrobenzene, chlorobenzene or ortho-dichlorobenzene, at a raised temperature or in water. The molecular proportions of the components are advantageously so chosen that for each amino group of the anthraquinone radical approximately one carboxylic acid chloride group or one group of the formula

of the acrylating agent is present.

In the form of the process described under (d) there are used as starting materials, more especially reaction products of aminoanthraquinones with cyanuric chloride, which products contain at least one exchangeable chlorine atom, for example, the compound of the formula

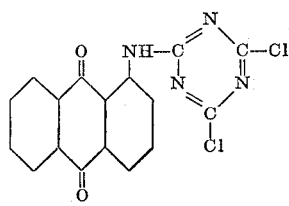

The condensation product is reacted with an amine containing a sulfonic acid-β-sulfatoalkylamide group, for example, the amine of the formula

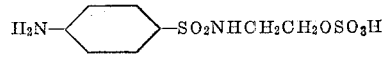

The dyestuffs so chosen can be isolated from the reaction mixture and, notwithstanding the presence of the reactive grouping of the Formula 1, they can be worked up into useful dry dyestuff preparations. They can be isolated from the reaction mixture by filtration. The filtered dyestuff, if desired after the addition of a neutral or weakly alkaline extender, may be dried. Drying is advantageously carried out at not too high a temperature, and if desired, under reduced pressure.

The dyestuffs of this invention are suitable for dyeing a wide variety of materials, but especially for dyeing or printing textile materials of natural or regenerated cellulose by the methods usual for dyeing or printing with vat dyestuffs. The dyeings and prints so produced are distinguished by their excellent fastness to light and wet fastness. In view of the fact that, in contradistinction to the conventional vat dyestuffs, they can generally not be removed to any substantial extent from the fiber by means of hot dimethylformamide, it must be assumed that the dyestuffs are chemically bound on the fiber.

The dyeings produced with the dyestuffs of this invention are therefore fast to dry cleaning and fast to migration. Fabrics dyed therewith can be coated with synthetic resins, for example, polyvinyl chloride, without the dyestuff migrating into the plastic, which is especially important in the manufacture of artificial leather.

The dyestuffs of this invention can generally be vatted very easily and frequently even at room temperature. The water-soluble dyestuffs containing a radical of the Formula 1 can be vatted very rapidly, even with mild reducing agents such as glucose. As the reactivity of the —OSO₃H groups in the sulfonic acid alkylamide radical may vary somewhat from dyestuff to dyestuff, it is of advantage to select the dyeing conditions, especially the concentration of alkali and reducing agent and also the duration and temperature of dyeing or steaming, depending on the dyestuff used. The optimum conditions can easily be determined by preliminary tests.

As compared with conventional vat dyestuffs, the vat dyes of the invention have the advantage of a better levelling and through-dyeing power. Moreover, in machine-dyeing, even when foaming occurs, they do not cause faulty dyeings due to the precipitation of reoxidized dyestuff, and the pigmentation necessary in dyeing wound bodies, for example, cross-wound spools or tricots on a reeling vat, with conventional vat dyestuffs is dispensed with when the dyestuffs of the invention are used. They can also be used in the form of solutions in the fast-running padding method, and there is no need for finely dispersed commercial forms or special paste forms, so that the disadvantages connected with the latter, namely, instability of the paste, dust and the necessity of one or more operations for producing finely dispersed powders, do not exist. Finally, they can usually be vatted very easily, frequently at room temperature and, if desired, with mild reducing agents. They possess a very good solubility in the vat, and especially on regenerated cellulose they produce strong and very level dyeings which have shades similar to those of the corresponding dyeings on cotton.

The following examples illustrate the invention, the parts and percentages being by weight unless otherwise stated, and the relationship of parts by weight to parts by volume being the same as that of the kilogram to the liter.

EXAMPLE 1

13.8 parts of 1-aminoanthraquinone-6-(β-hydroxyethyl)-sulfonamide (prepared by condensing 1-nitroanthraquinone-6-sulfochloride with monoethanolamine and reduction with sodium hydrosulfide in an aqueous solution) are heated in 150 parts of nitrobenzene with 4.5 parts of 2-phenyl-4:6-dichlorotriazine-(1:3:5) for 5 hours with stirring at 150 to 155° C. After cooling, the dyestuff which crystallizes in orange needles is isolated in the usual manner.

10 parts of the so-obtained compound of the formula

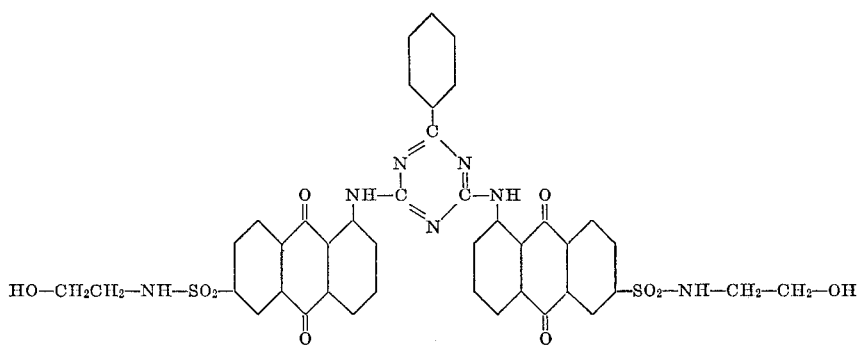

are slowly added at 0 to 5° C. to 180 parts of concentrated sulfuric acid and dissolved therein. The whole is then poured into about 800 parts of ice water and filtered. The moist filter cake is suspended in about 1000 parts of water and neutralized with sodium hydroxide solution. 20 parts of sodium chloride are added, the mixture is suction-filtered and the filter residue is dried in vacuo at 60 to 70° C.

In the form of its free acid and the new dyestuff corresponds to the formula

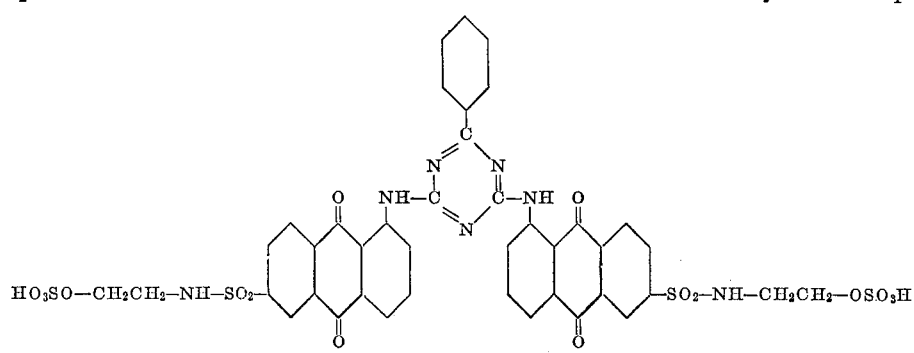

and is completely soluble in water, giving a yellow solution.

A solution of 10 parts of the dyestuff in 1000 parts of water is used to impregnate a cotton fabric so that its weight shows an increase of 75%, and the fabric is then dried. The fabric is then impregnated with a solution containing per liter 40 cc. of sodium hydroxide solution of 36° Bé., 30 grams of Rongalite and 200 grams of sodium chloride, squeezed to a weight increase of 75%, and the dyeing is steamed for 1 to 5 minutes at 100° C., thoroughly rinsed in cold water, treated with a 0.5% solution of sodium bicarbonate, rinsed with water, soaped for 20 minutes at the boil with yellow soap-suds, again rinsed, and finally dried. A yellow dyeing is obtained which has good properties of fastness.

EXAMPLE 2

10.6 parts of the sulfochloride of the formula

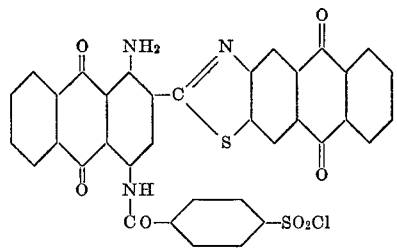

(prepared by condensing the appropriate amine with benzoyl chloride-4-sulfochloride in nitrobenzene at 140° C.)

are pasted at 120° C. with 120 parts of nitrobenzene. 1.8 parts of monoethanolamine are added, and the mixture is stirred for 4 hours at 120 to 125° C., then allowed to cool, and the product is filtered off, washed successively with benzene, alcohol and water, and dried.

10 parts of the resulting condensation product are stirred into 180 parts of concentrated sulfuric acid at 0 to 5° C., and dissolved therein. The working up is carried out as described in Example 1.

The new dyestuff corresponds to the formula

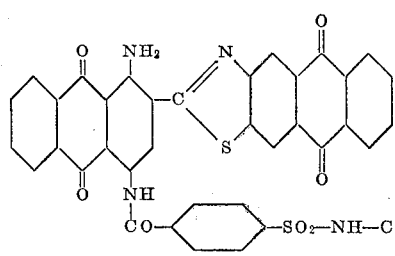

and gives a blue solution in water.

Dyeing Process A 1.5 parts of dyestuff are dissolved in 500 parts of water at 60° C. The dissolved dye is vatted in a dyebath containing 20 parts of sodium hydroxide solution of 30% strength and 12 parts of sodium hydrosulfite in 3500 parts of water. At 50° C., 100 parts of well wetted cotton are introduced into this dyebath, and dyeing is carried out for 45 minutes at that temperature. After the first 10 minutes, 60 parts of sodium chloride are added, and after the first 20 minutes, another 60 parts of sodium chloride are added. The cotton is then taken out of the bath, oxidized, neutralized, thoroughly soaped at the boil, rinsed in warm water and then in cold water, and dried.

A greenish blue dyeing having good fastness properties is obtained.

EXAMPLE 3

When in Example 2 there is used instead of the sulfochloride first mentioned the sulfochloride of the formula

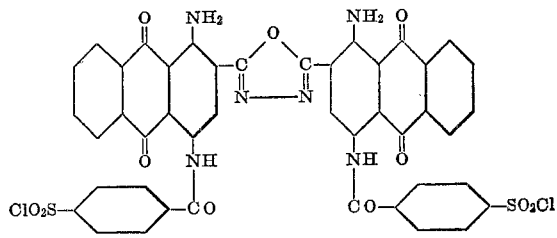

and the same procedure followed, there is obtained the dyestuff of the formula

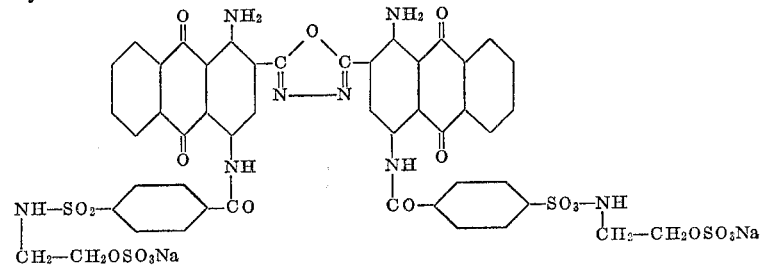

When used according to Dyeing Process A, this dyestuff yields strong reddish blue dyeings having good fastness properties.

EXAMPLE 4

14.7 parts of 4:6-dichloro-2-[(5)-benzoylamino-anthraquinonly-(1)-amino]-1:3:5-triazine are pasted at 100° C. with 200 parts of nitrobenzene and 15 parts of N:N-diethylaniline. 6.5 parts of 3-aminobenzene-β-hydroxyethylsulfonamide are then strewn in, and the mixture is stirred for 6 hours at 100 to 105° C. The dyestuff crystallizes out in very fine, small needles; it is filtered off, washed with alcohol and then with water, and dried.

10 parts of the so-obtained compound of the formula

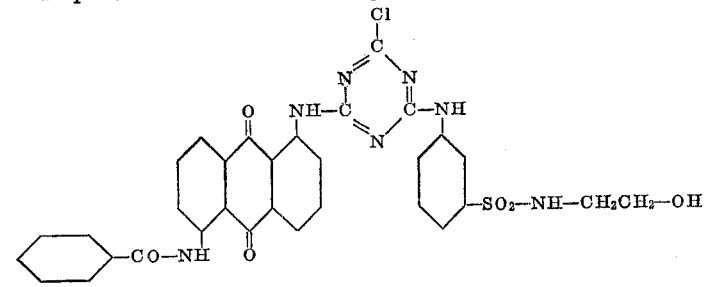

are slowly added at 0 to 5° C. to 180 parts of sulfuric acid of 100% strength and dissolved therein. The dyestuff is isolated as described in Example 1; in the form of its free acid it corresponds to the formula

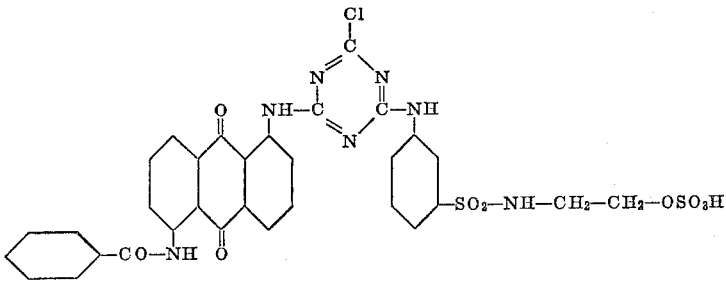

and dyes cotton and regenerated cellulose by the following method fast yellow tints.

Dyeing Process B 3 parts of dyestuff are suspended in 500 parts of water at 60° C. The suspended dyestuff is vatted in a dyebath containing 20 parts of sodium hydroxide solution of 30% strength and 12 parts of sodium hydrosulfite in 3500 parts of water. 100 parts of well wetted cotton are entered into this dyebath at 50° C and dyeing carried out for 45 minutes at that temperature. After the first 10 minutes, 60 parts of sodium chloride are added, and after the first 20 minutes, another 60 parts of sodium chloride are added. The cotton is then removed from the bath, oxidized, neutralized, thoroughly soaped at the boil, rinsed in warm water and then in cold water, and dried.

A yellow dyeing having good fastness properties is obtained.

EXAMPLE 5

22.4 parts of the condensation product from 2 molecular proportions of 1-aminoanthraquinone and 1 molecular proportion of cyanuric chloride in 250 parts of nitrobenzene are stirred in the presence of 26 parts of 3-aminobenzene-sulfonic acid - N - β - hydroxyethylamide for 10 hours at 180 to 185° C. The whole is allowed to cool, filtered, and the filter residue is washed successively with benzene, alcohol and water, and then dried.

10 parts of the resulting condensation product are slowly stirred at 0 to 5° C. into 180 parts of sulfuric acid of 96% strength and dissolved therein. Working up is carried out as described in Example 1. The new dyestuff corresponds in the form of its free acid to the formula

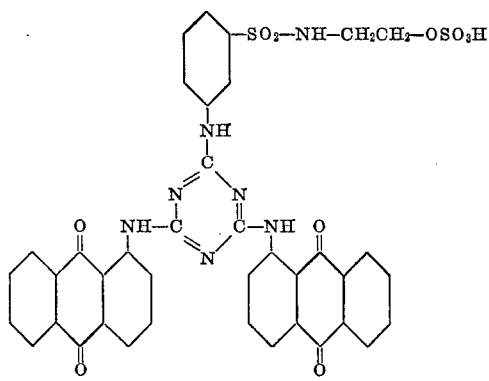

It dyes cotton and regenerated cellulose by the method B described in Example 4 yellow tints having excellent properties of fastness.

The corresponding derivative of 2-phenyl-4:6-dichlorotriazine-(1:3:5) dyes cotton and regenerated cellulose greenish yellow tints of similarly good properties. It can be prepared in the following manner:

A solution of 18.9 parts of 2-phenyl-4:6-dihydroxytriazine-(1:3:5) in 175 parts of chlorosulfonic acid is heated for 1 hour at 130 to 135° C. and then for 4 hours at 140 to 145° C., poured over about 1000 parts of ice, filtered, and the precipitate is suspended in 500 parts of ice water, accurately neutralized with sodium hydroxide solution, suction-filtered and dried under reduced pressure.

14.4 parts of the resulting sulfochloride are refluxed for 3 hours with 84 parts of phosphorus oxychloride and 45 parts of phosphorus pentachloride, then cautiously poured over about 1500 parts of ice, maintained for 30 minutes at 0° C. with energetic stirring, suction-filtered, and the filter residue is washed neutral with ice water, dried and recrystallized from trichlorethylene; the product melts at 142° C.

6.5 parts of the resulting sulfochloride of the phenyldichlorotriazine are mixed with 100 parts of nitrobenzene and 9.3 parts of 1-aminoanthraquinone, and the mixture is heated for 4 hours at 140 to 145° C. The sulfochloride, which crystallizes in the form of needles, is filtered off, washed with benzene, and dried in vacuo.

13 parts of the resulting dyestuff sulfochloride are pasted at 120° C. with 140 parts of nitrobenzene. At the same temperature 4.6 parts of monoethanolamine are slowly added dropwise, and the whole is stirred for 2 hours at 120° C. and then for 1 hour at 140° C., and allowed to cool. The dyestuff, which crystallizes in the form of fine small needles, is filtered off, successively washed with benzene, alcohol and water, and dried.

10 parts of the resulting condensation product are added at 0 to 5° C. to 180 parts of sulfuric acid of 96% strength and dissolved therein. The whole is poured over ice and then worked up as described in Example 1.

In the form of its free acid the new dyestuff corresponds to the formula

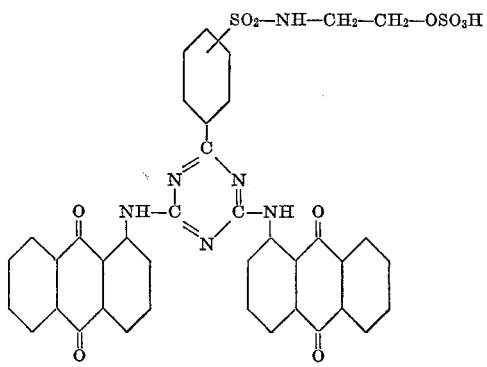

When the condensation is performed with 1-amino-5-benzoylaminoanthraquinone instead of with 1-aminoanthraquinone, a dyestuff is obtained which dyes cotton and regenerated cellulose from an alkaline hydrosulfite vat golden orange tints having excellent properties of fastness. When 1-amino-4-benzoylaminoanthraquinone is used, red tints are obtained, and with 1:4-diamino-2-acetylanthraquinone blue tints result, both shades having similarly good properties of fastness.

EXAMPLE 6

19.6 parts of the disulfochloride of the formula

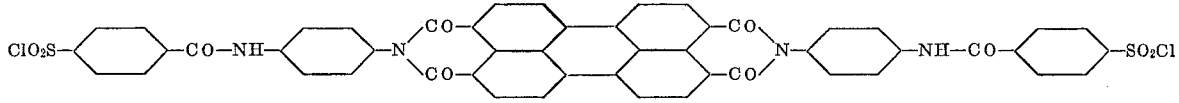

(prepared from the appropriate diamine by condensation with benzoylchloride-4-sulfochloride in nitrobenzene) are pasted at 140° C. with 300 parts of nitrobenzene. 10 parts of mono-ethanolamine are then added dropwise within 1 hour at 140 to 145° C., and the mixture is heated for 5 hours at the same temperature, then allowed to cool, and the product is filtered off, washed successively with benzene, alcohol and water, and dried.

10 parts of the resulting condensation product are stirred at 0 to 5° C. into 180 parts of concentrated sulfuric acid and dissolved therein. The solution is cautiously poured into ice water and isolated in the usual manner.

In the form of its free acid the new dyestuff corresponds to the formula

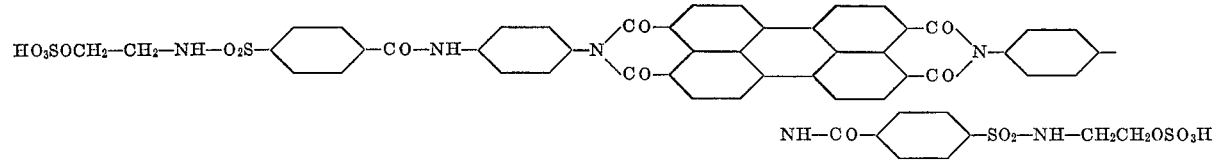

It dyes cotton and regenerated cellulose from an alkaline hydrosulfite vat red tints.

EXAMPLE 7

11.4 parts of isodibenzanthrone are added at 20 to 25° C. to 210 parts of chlorosulfonic acid, and the whole is stirred for 1 hour at the same temperature, and then heated at 70 to 75° C. until a test portion dissolves in aqueous pyridine of 10% strength, which is the case after about 5 hours. The mixture is then cautiously poured over ice, the precipitated sulfochloride is suctioned off and washed with ice water.

The isodibenzanthrone disulfochloride so obtained is suspended in the form of a moist press cake in 700 parts of ice water and at 0 to 5° C. treated with 300 parts of monoethanolamine. The mixture is stirred on for about 2 hours at 0 to 5° C., then allowed to heat up to room temperature, and stirred for a further 15 hours. Finally, the whole is heated for 1 hour at 60 to 65° C., suction-filtered while still warm, and the filter residue is washed with water until it is neutral, and then dried.

7 parts of the resulting condensation product are added at 0 to 5° C. to 180 parts of sulfuric acid of 96% strength and dissolved within 4 hours. The sodium is then cautiously poured over about 800 parts of ice, and the precipitate is suctioned off, pasted with 1000 parts of water at 30 to 40° C., and neutralized with sodium hydroxide solution. 50 parts of sodium chloride are added, the whole is suction-filtered, and the filter residue is dried in vacuo at 60 to 70° C.

In the form of its free acid the new dyestuff corresponds to the formula

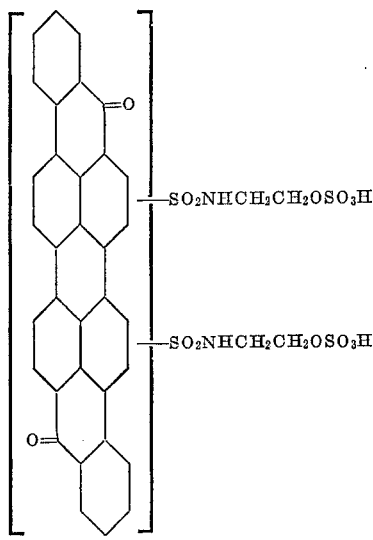

and is completely soluble in water, giving a blue-violet solution. For dyeing it is used in the following manner.

Dyeing Process C 1.5 parts of dyestuff are dissolved in 500 parts of water at 60° C. The dissolved dyestuff is vatted in a dyebath containing 60 parts of sodium hydroxide solution of 30% strength and 12 parts of sodium hydrosulfite in 3500 parts of water. 100 parts of well wetted cotton are entered at 60% C. into this dyebath, and dyeing is carried out for 10 minutes at that temperature with the addition of 60 parts of sodium chloride. The temperature is then raised to 70° C., and another 60 parts of sodium chloride added. After 15 minutes, the dyeing temperature is raised to 80° C. and maintained at that level for 15 minutes. The cotton is then removed from the bath, oxidized, neutralized, thoroughly soaped at the boil, rinsed in warm water and then in cold water, and dried.

There is obtained a brilliant reddish blue dyeing having good fastness properties.

EXAMPLE 8

11.4 parts of dibenzanthrone are added at 20 to 25° C. to 210 parts of chlorosulfonic acid, and the mixture is stirred for 1 hour at the same temperature and then heated at 60 to 65° C. until a test portion is soluble in aqueous pyridine of 10% strength, which is the case after about 8 hours. Working up is carried out as described in Example 7.

The dibenzanthrone disulfo-dichloride so prepared is condensed, as described in the second paragraph of Example 7, with monoethanolamine and then esterified with concentrated sulfuric acid according to Example 7, third paragraph.

In the form of its free acid the new dyestuff corresponds to the formula

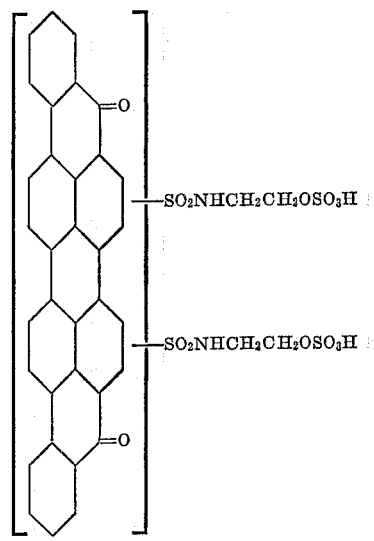

It dissolves completely in water, giving a blue solution, and produces by the method C described in Example 7 strong reddish blue dyeings having excellent properties of fastness.

EXAMPLE 9

13.3 parts of 3:4:8:9-dibenzpyrenequinone-(5:10) are added to 250 parts of chlorosulfonic acid, and the whole is heated for 1 hour at 60 to 65° C., then for 4 hours at 80 to 85° C. and finally for 9 hours at 100 to 103° C. The reaction mixture is then poured over ice, isolated in the usual manner, condensed with monoethanolamine according to Example 7, second paragraph, and then esterified with concentrated sulfuric acid acccording to Example 7, third paragraph.

The new dyestuff gives a yellow aqueous solution and dyes cotton from an alkaline vat yellow tints.

EXAMPLE 10

When in Example 7 there is used, instead of 300 parts of monoethanolamine, the same quantity of 1-aminopropanol-(2), the procedure being otherwise the same, there is obtained the dyestuff of the formula

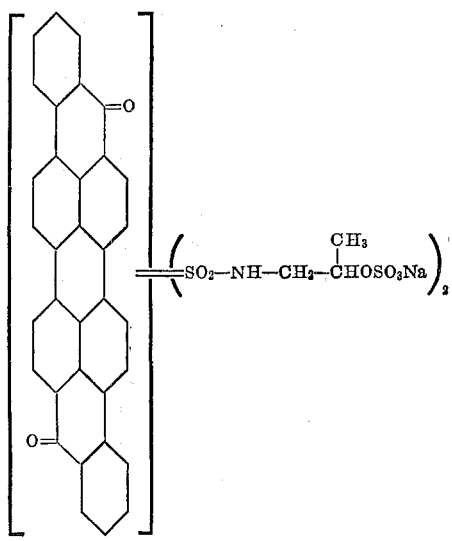

This dyestuff, when used according to Dyeing Process C, yields vigorous reddish blue dyeings having good fastness properties.

EXAMPLE 11

When, in Example 7, 13.1 parts of dichloroisodibenzanthrone are used instead of 11.4 parts of isodibenzanthrone, and the sulfochlorination is performed at 80–85° C., there is obtained the dyestuff of the formula

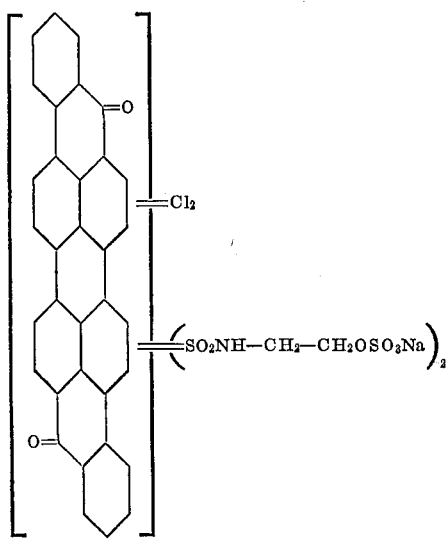

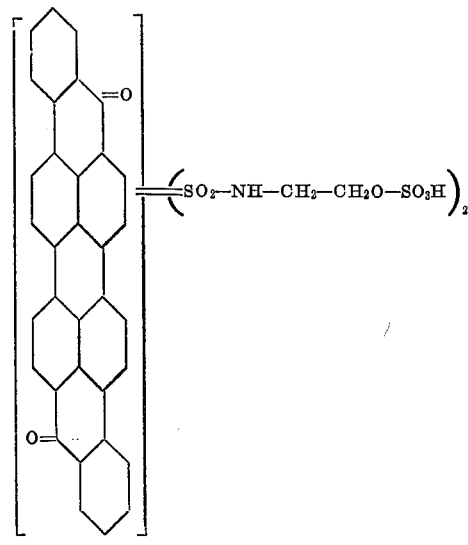

According to Dyeing Process C, this dyestuff yields vigorous violet dyeings having good fastness properties.

EXAMPLE 12

11.4 parts of isodibenzanthrone are introduced into 210 parts of chlorosulfonic acid and stirred for one hour at 20–30° C. The reaction mixture is then heated to 80° C. and stirred at that temperature for 4 hours. After cooling, the mixture is poured very carefully on to ice-water while stirring thoroughly. The precipitated sulfochloride is rapidly filtered off and washed with ice-water. The moist sulfochloride is then introduced into a mixture of 100 parts of β-aminoethyl-sulfuric acid semi-ester, 300 parts of water and 22 cc. of sodium hydroxide solution of 30% strength (pH of the solution 9.5) at 5–10° C., and the reaction mixture heated in the course of 3 hours to 20° C., the pH of the solution being kept constant by the dropwise addition of concentrated sodium hydroxide solution. Stirring is continued overnight at room temperature; the reaction mixture is then heated for 2 to 3 hours at 40–50° C. The product is isolated by filtration and dried in vacuo at 40–50° C. The new dyestuff in the form of the free acid corresponds to the formula

EXAMPLE 13

When the condensation described in Example 8 is performed with 2-aminobutanol-(1) instead of with monoethanolamine, the dyestuff of the formula

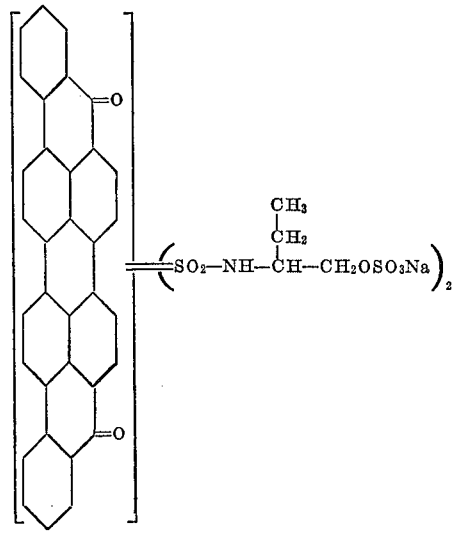

is obtained.

Bly the Dyeing Process C (see Example 7), this dyestuff yields vigorous reddish blue shades on cotton. The dyeings have excellent fastness properties.

EXAMPLE 14

6.2 parts of the compound of the formula

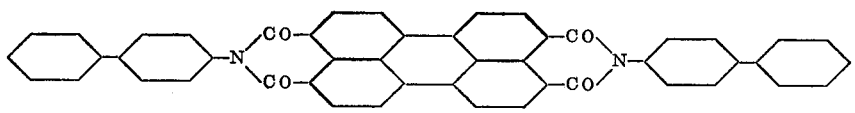

are introduced into 150 parts of chlorosulfonic acid and dissolved. The solution is stirred at room temperature for 15 minutes, then carefully poured onto ice, the sulfochloride which precipitates is filtered off with suction, and washed with some ice-water. The moist sulfochloride is then quickly introduced into a mixture of 50 parts of β-aminoethyl-sulfuric acid semiester, 150 parts of water, and 11 parts by volume of 30% sodium hydroxide solution (pH 9.4), the pH value being kept constant by the dropwise addition of sodium hydroxide solution of 30% strength. The batch is then stirred at room temperature for 15 hours. It is then heated at 40-50° C. for 2 hours, the product isolated by filtration, and dried under vacuum at 40-50° C. The resulting dyestuff corresponds to the formula

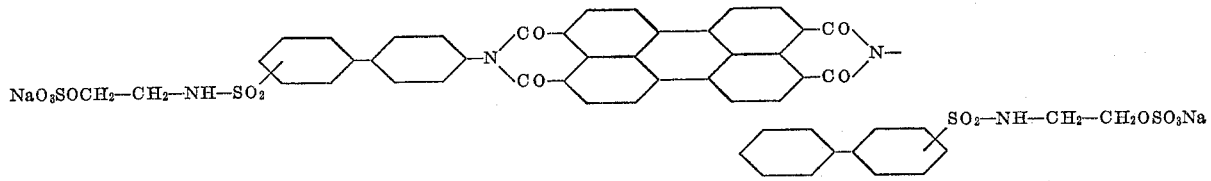

with some ice-water, and condensed with monoethanolamine according to Example 7. The resulting sulfonamide is esterified with concentrated sulfuric acid as described there.

The resulting new dyestuff corresponds to the formula

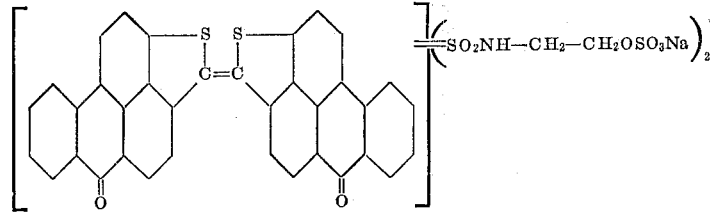

It dissolves completely in water to give a blue-green coloration. When used for Dyeing Process D, it gives vigorous blue-green dyeing having good fastness properties.

Dyeing Process D 2.2 parts of dyestuff are suspended in 500 parts of water of 60° C. The suspended dyestuff is vatted in a dyebath containing 20 parts of sodium hydroxide solution of 30% strength and 12 parts of sodium hydrosulfite in 3500 parts of water. 100 parts of well wetted cotton are introduced at 60° C. into this dyebath, and dyeing carried out at that temperature for 10 minutes with the addition of 60 parts of sodium chloride. The temperature is then raised to 70° C., and another 60 parts of sodium chloride added. After 15 minutes, the temperature is raised to 80° C., and dyeing continued for 15 minutes at that temperature. The cotton is then removed from the dyebath, oxidized, neutralized, thoroughly soaped at the boil, washed in warm water, then in cold water, and dried.

A vigorous red dyeing having good fasteners properties is obtained.

EXAMPLE 15

13.6 parts of the compound of the formula

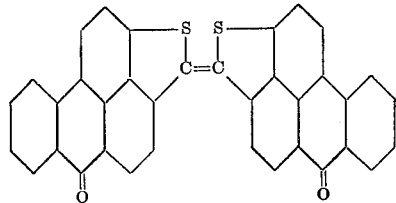

are introduced into 260 parts of chlorosulfonic acid and the resulting solution stirred for 24 hours at room temperature. It is then carefully poured onto ice, the sulfochloride which precipitates is filtered off, washed

EXAMPLE 16

10.3 parts of the dyestuff of the formula

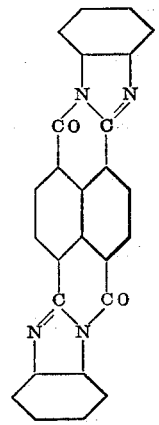

are introduced into 220 parts of chlorosulfonic acid and the mixture stirred for 1 hour at room temperature. It is stirred while being heated to 40° C., and maintained at that temperature for 2 hours. After that, it is stirred at 50-55° C. for 3 hours. After cooling, the mixture is carefully poured onto ice, the sulfochloride which precipitates is filtered off, washed with some ice water, and condensed with monoethanolamine according to Example 7. Esterification is performed according to Example 7 with concentrated sulfuric acid for 10 hours at room temperature.

The new dyestuff so obtained corresponds to the formula

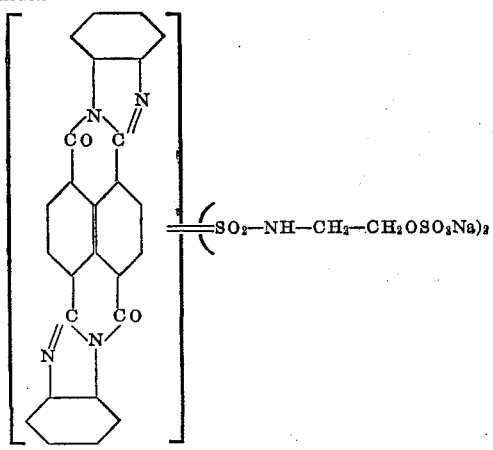

and dissolves completely in water. In the dyeing Process D of Example 14, it yields orange dyeings.

EXAMPLE 17

13.4 parts of the dyestuff of the formula

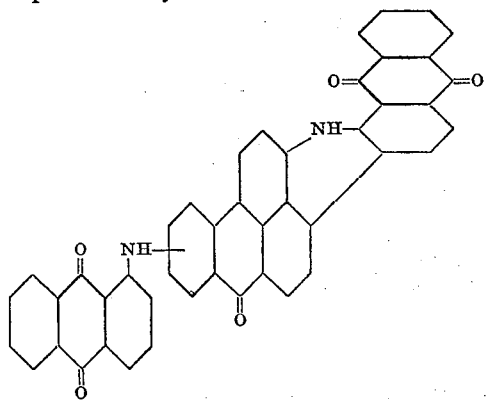

are dissolved in 280 parts of chlorosulfonic acid. The solution is stirred for 14 hours while being heated at 100 to 105° C. After cooling, it is carefully poured onto ice, and the sulfochloride which precipitates is filtered off, washed with ice water, and condensed with monoethanolamine according to Example 7. Esterification is performed in a maner analogous to that of Example 7 with 100% sulfuric acid for 3 hours at room temperature.

In Dyeing Process D, the new water-soluble dyestuff yields vigorous olive-gray dyeings having good fastness properties.

EXAMPLE 18

6 parts of the compound of the formula

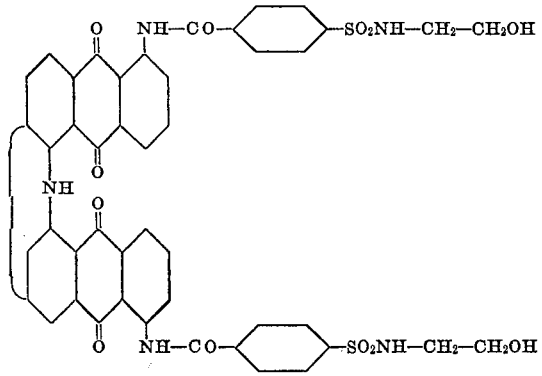

are introduced at 5–12° C. and into 150 parts of 100% sulfuric acid, and for complete dissolution, the mixture is stirred for 4 hours at 0–5° C. The product is worked up as described in Example 10.

The new water-soluble dyestuff corresponds to the formula

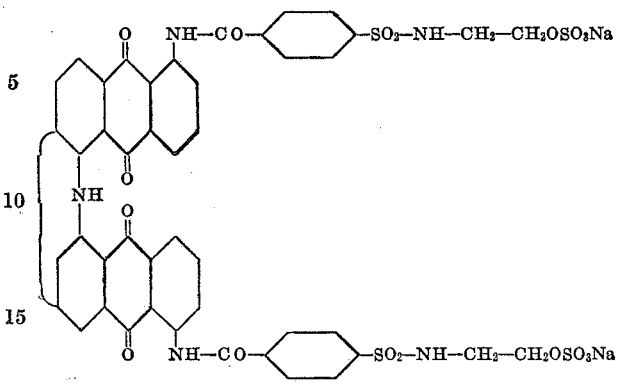

and in Dyeing Process A gives golden orange dyeings having good fastness properties.

The first-mentioned compound can be obtained as follows:

24.4 parts of benzoic acid-para-sulfochloride in 250 parts of nitrobenzene are stirred and heated to 100–110° C. for 1 hour together with 20 parts of thionyl chloride and 0.5 part of dimethylformamide. From the resulting clear solution, the excess thionyl chloride is distilled off under reduced pressure. 22.9 parts of 5,5'-diamino-1,1'-dianthrimide-carbazole are then added, and the whole kept at 120–125° C. for 21 hours. The product is isolated by filtration.

8.6 parts of the sulfochloride of the formula

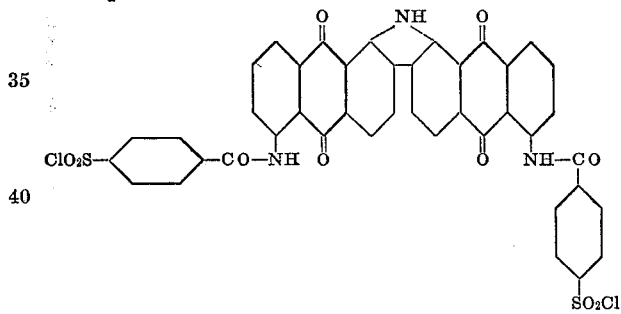

so obtained are stirred in 130 parts of nitrobenzene at 120° C. After the addition of 6.2 parts of monoethanolamine, the mixture is stirred while being heated at 120–125° C. for 4 hours and at 140–154° C. for 6 hours. After cooling, the product is isolated by filtration and triturated in a dish with alcohol, filtered off, and washed with alcohol.

When in this example the benzoic acid-para-sulfochloride is replaced by the same quantity of benzoic acid-meta-sulfochloride, and the resulting sulfochloride is treated as described, there is obtained the dyestuff of the formula

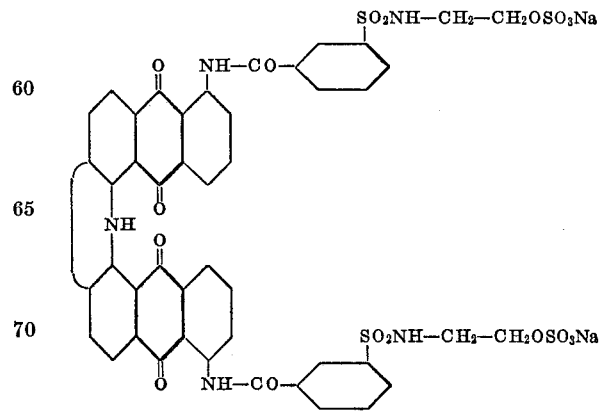

which likewise yields golden orange dyeings having good fastness properties.

EXAMPLE 19

10.1 parts of pyranthrone are introduced into 175 parts of chlorosulfonic acid and the resulting solution heated to 80–85° C. for 22 hours, then carefully poured onto ice. The sulfochloride which precipitates is filtered off, washed with some ice water, and condensed with monoethanolamine according to Example 7. The resulting sulfonamide is esterified with concentrated sulfuric acid, as described there.

The water-soluble dyestuff so obtained corresponds to the formula

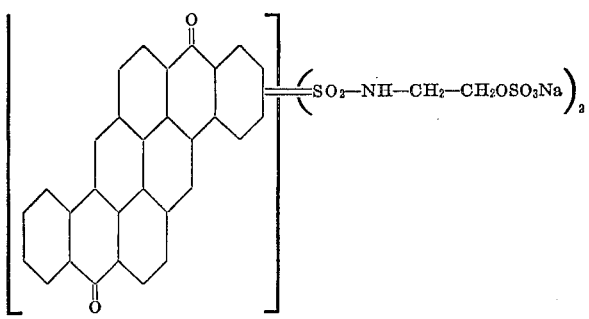

When used for Dyeing Process D it yields golden orange dyeings.

What is claimed is:

1. Dibenzanthrone vat dyestuff which consists essentially of chromophoric dibenzanthrone vat dye grouping and two radicals of the formula

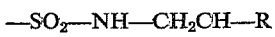

in which R is —OSO$_3$H, wherein the substituent radicals occupy the positions of the dibenzanthrone ring system occupied by sulfonic acid chloride groups when conducting the di-chlorosulfonating step under conditions wherein the ratio of dibenzanthrone to chlorosulfonic acid is about 1:18.4 by weight.

2. The vat dyestuffs of the formula

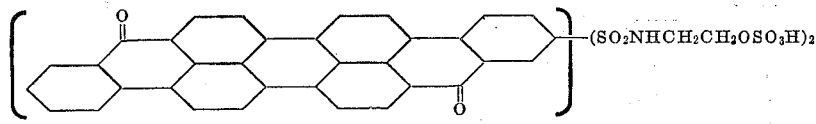

wherein the substituent groups occupy the positions of the ring system which are occupied by sulfonic acid chloride groups when the di-chlorosulfonating step is conducted under conditions wherein the ratio of isodibenzanthrone to chlorosulfonic acid is about 1:18.4 by weight.

3. The vat dyestuffs of the formula

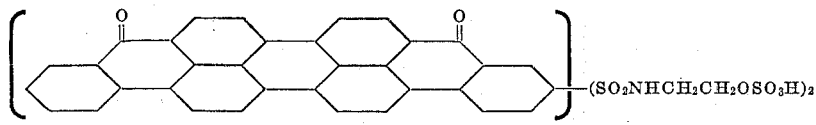

wherein the substituent groups occupy those positions of the ring system which are occupied by sulfonic acid chloride groups when the di-chlorosulfonating step is conducted under conditions wherein the ratio of dibenzanthrone to chlorosulfonic acid is about 1:18.4 by weight.

4. A vat dyestuff of the formula $$K\text{—}(\text{—}SO_2NH\text{—}R)_2$$

wherein R is β-sulfato lower alkyl and K is the isodibenzanthronyl chromophore, wherein the substituent groups occupy those positions of the ring system which are occupied by sulfonic acid chloride-groups when the di-chlorosulfonating step is carried out under conditions wherein the ratio of isodibenzanthrone to chlorosulfonic acid is about 1:18.4 by weight.

References Cited
UNITED STATES PATENTS

| | | | |
|---|---|---|---|
| 2,051,045 | 8/1936 | Holmes et al. | 260—353 |
| 2,731,476 | 1/1956 | Peter et al. | 260—371 |
| 3,066,005 | 11/1962 | Wedemeyer et al. | 8—54 |

LORRAINE A. WEINBERGER, Primary Examiner

H. C. WEGNER, Assistant Examiner

U.S. Cl. X.R.

8—34; 260—372, 249, 303, 307.5, 281, 316, 309.2, 274